(12) United States Patent
Natori

(10) Patent No.: US 11,068,212 B2
(45) Date of Patent: Jul. 20, 2021

(54) INFORMATION PROCESSING APPARATUS FOR ACQUIRING AN APPLICATION, CONTROL METHOD, AND STORAGE MEDIUM

(71) Applicant: CANON KABUSHIKI KAISHA, Tokyo (JP)

(72) Inventor: Takuya Natori, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/591,078

(22) Filed: Oct. 2, 2019

(65) Prior Publication Data

US 2020/0110559 A1  Apr. 9, 2020

(30) Foreign Application Priority Data

Oct. 5, 2018 (JP) .............................. JP2018-190015

(51) Int. Cl.
*G06F 3/12* (2006.01)
(52) U.S. Cl.
CPC .......... *G06F 3/1205* (2013.01); *G06F 3/1243* (2013.01); *G06F 3/1254* (2013.01); *G06F 3/1276* (2013.01); *G06F 3/1288* (2013.01)
(58) Field of Classification Search
None
See application file for complete search history.

(56) References Cited

U.S. PATENT DOCUMENTS

| | | | | |
|---|---|---|---|---|
| 8,860,991 B2* | 10/2014 | Choi | ..................... | G06F 3/1228 |
| | | | | 358/1.15 |
| 10,120,626 B1* | 11/2018 | Siy | ....................... | G06F 3/1206 |
| 2007/0008567 A1* | 1/2007 | Choi | ..................... | G06F 3/1228 |
| | | | | 358/1.13 |
| 2010/0177347 A1* | 7/2010 | Mitani | .................. | G06F 3/1225 |
| | | | | 358/1.15 |
| 2011/0069341 A1* | 3/2011 | Kim | ...................... | G06F 3/1204 |
| | | | | 358/1.15 |
| 2011/0286022 A1* | 11/2011 | Kakitsuba | ............. | G06F 3/1232 |
| | | | | 358/1.13 |
| 2012/0137312 A1* | 5/2012 | Asahara | ................ | G06F 3/1203 |
| | | | | 719/321 |
| 2019/0340015 A1* | 11/2019 | Saigusa | ..................... | G06F 8/61 |

FOREIGN PATENT DOCUMENTS

JP        2011-243067 A    12/2011

* cited by examiner

*Primary Examiner* — Dung D Tran
(74) *Attorney, Agent, or Firm* — Canon U.S.A., Inc. IP Division

(57) ABSTRACT

An information processing apparatus including a shared printer driver which is usable in common with respect to a plurality of different printing apparatuses includes a first acquisition unit configured to acquire, in response to receiving an instruction to add a printing apparatus which is to be used with the shared printer driver, identification information for identifying a type of the printing apparatus, and a second acquisition unit configured to acquire, with use of the identification information acquired by the first acquisition unit, information indicating a characteristic of a printing apparatus corresponding to the identification information from a server different from the printing apparatus, wherein a user interface (UI) for use in performing print setting is displayed based on the information indicating the characteristic acquired by the second acquisition unit.

23 Claims, 12 Drawing Sheets

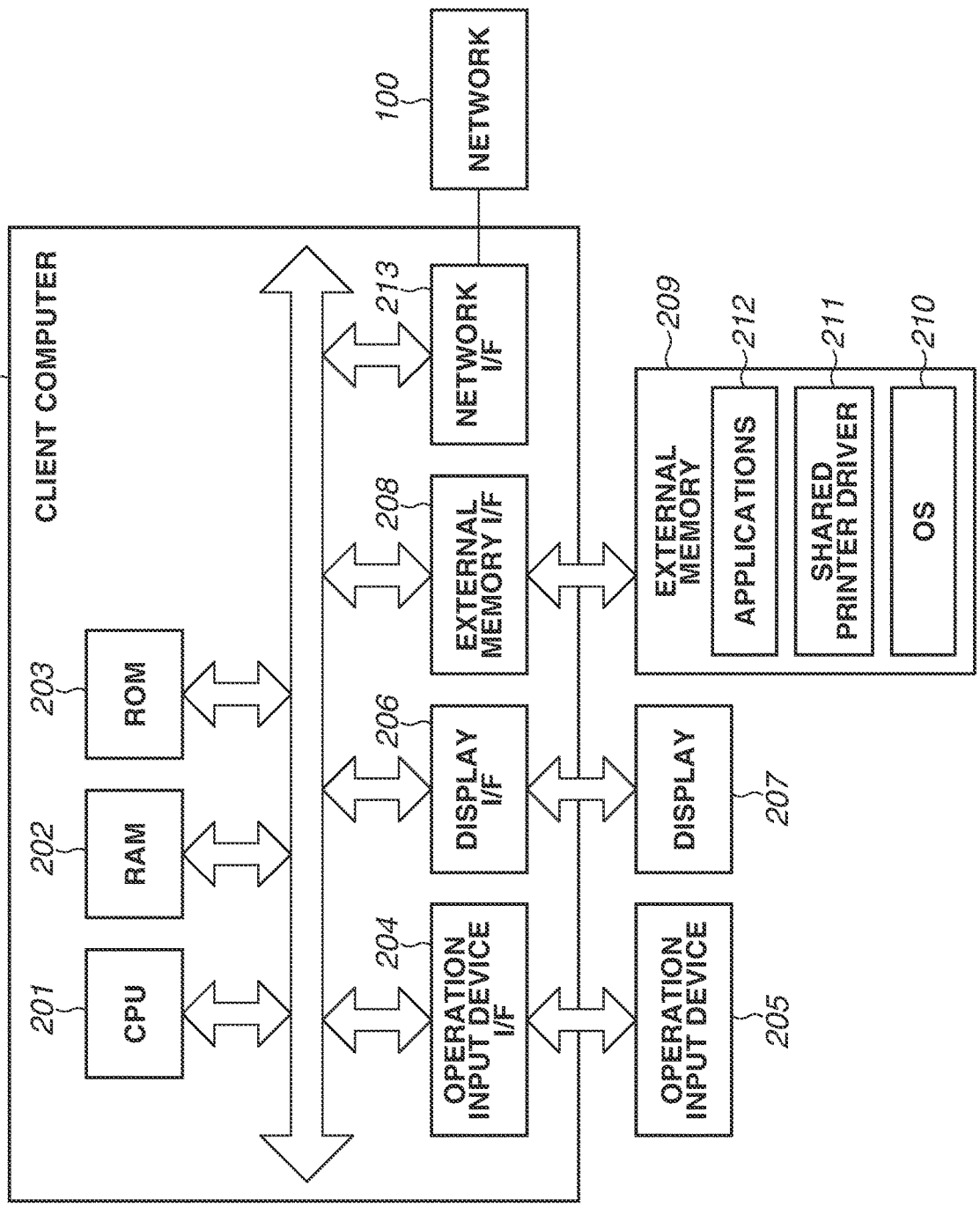

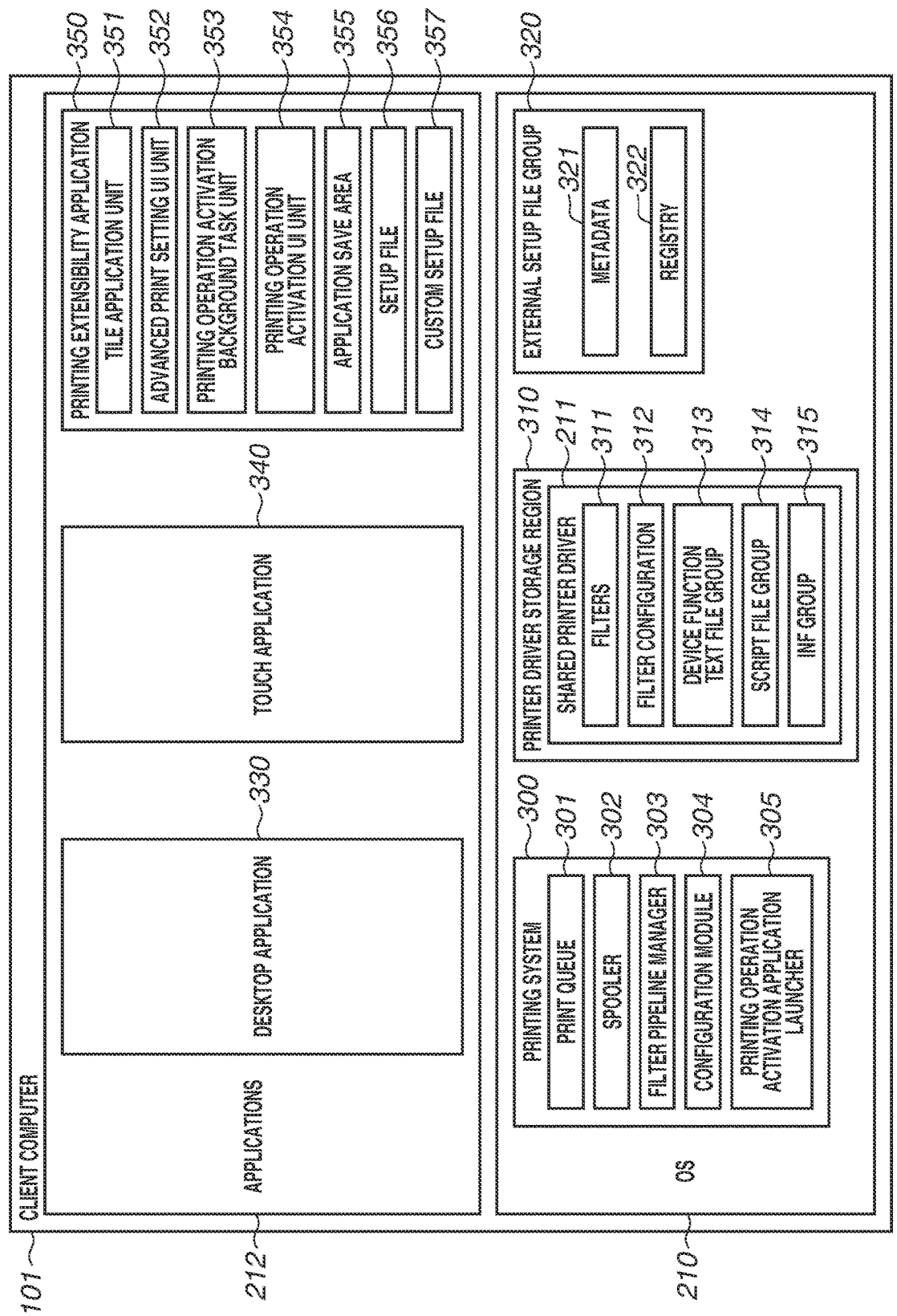

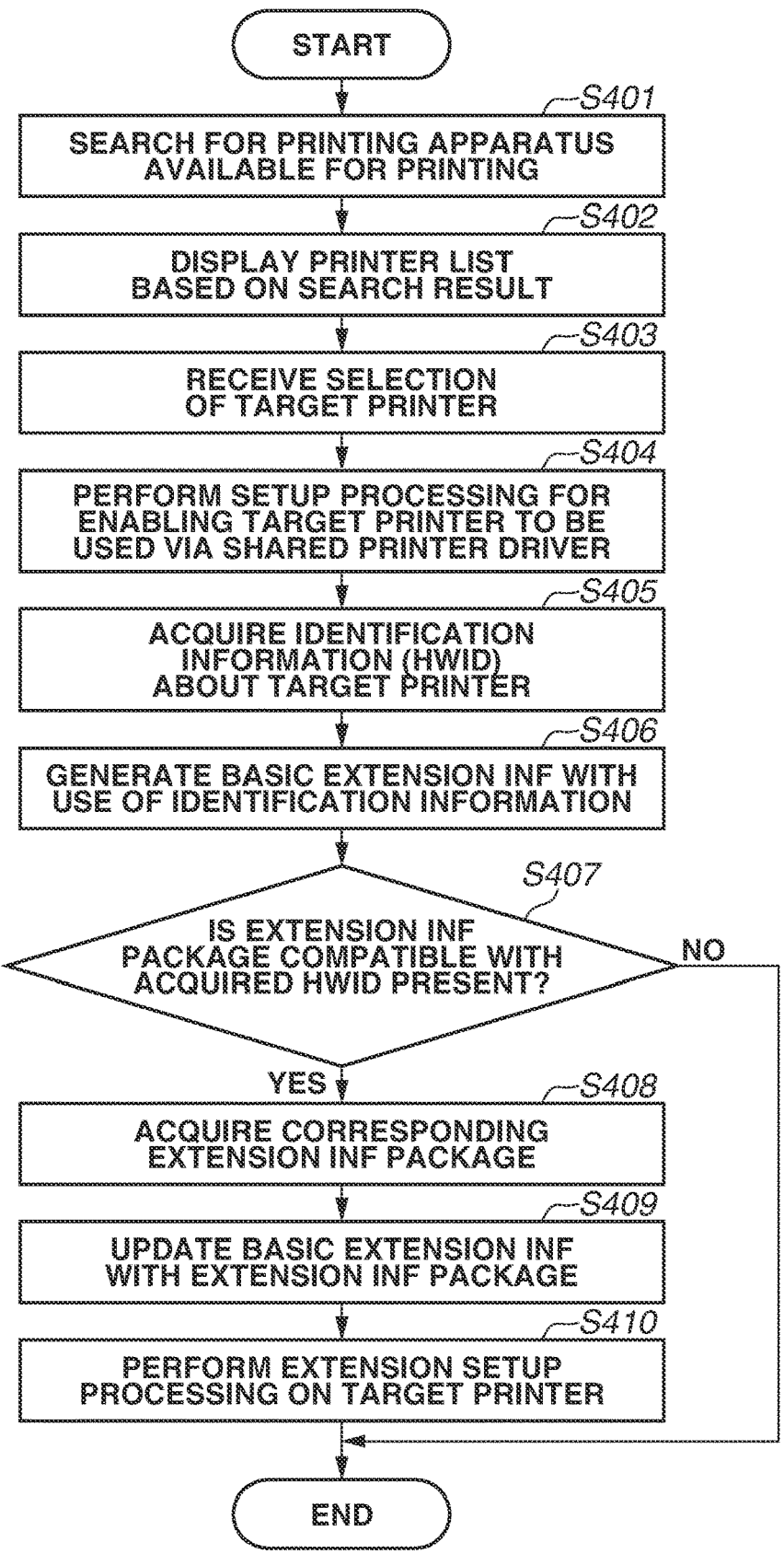

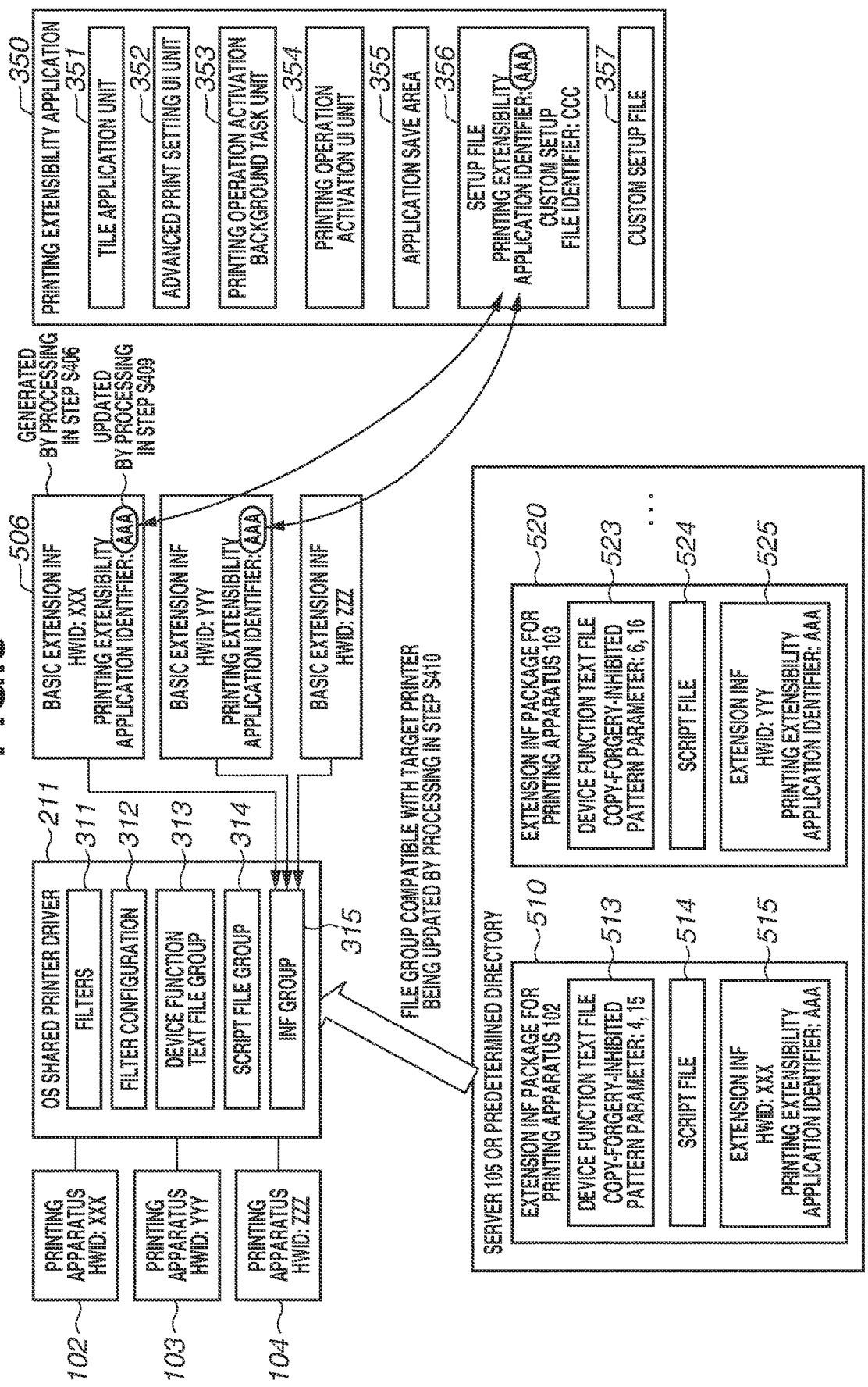

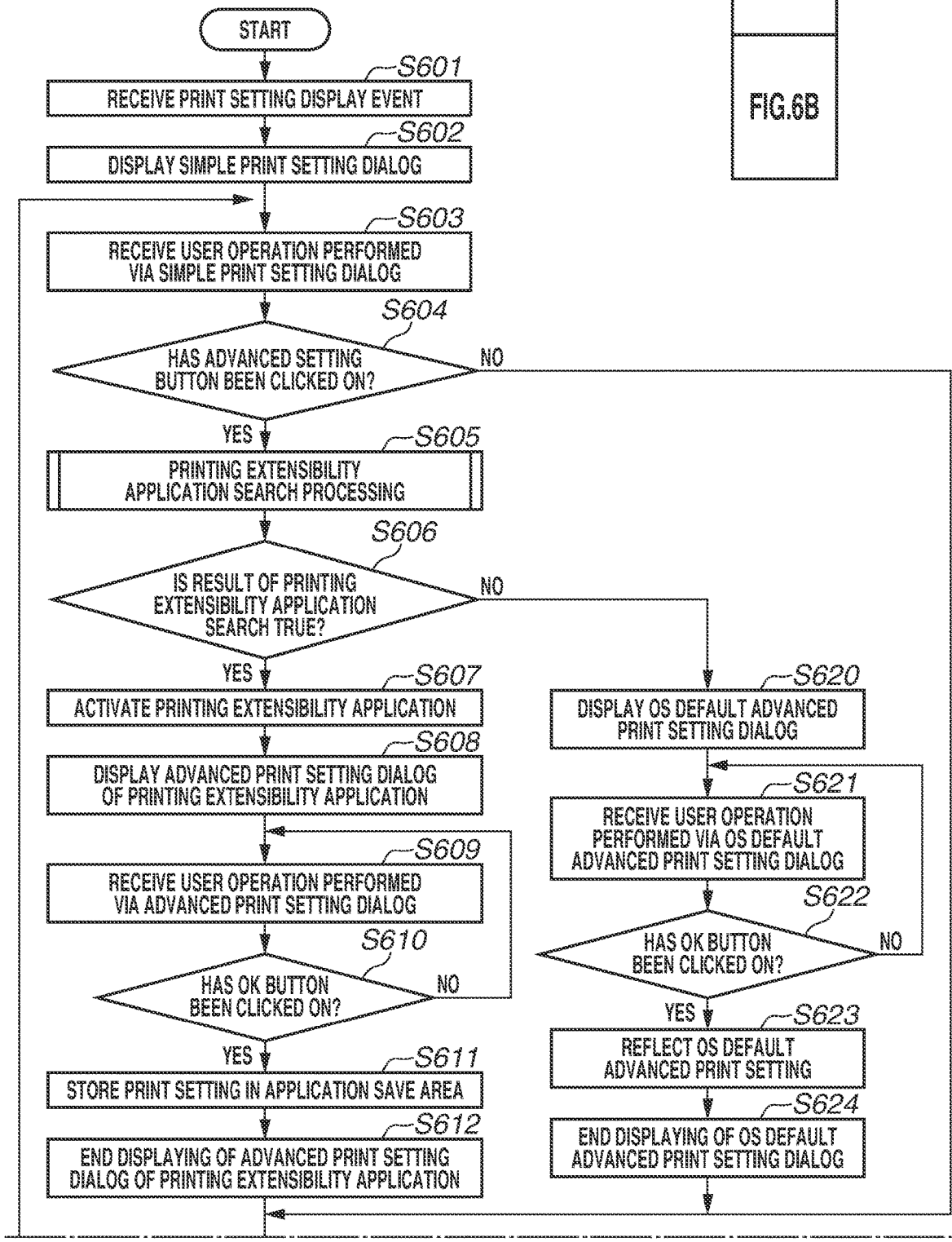

FIG.7A

| | | |
|---|---|---|
| PRINTER | printer 102 ▼ | —701 |
| PAPER SIZE | A4 ▼ | —702 |
| NUMBER OF COPIES | 1 ▼ | —703 |

ADVANCED SETTING —705

PRINT —710   CANCEL —711

| | | |
|---|---|---|
| N-UP PRINTING | 2 in 1 ▼ | —721 |

☑ STAPLING

| STAPLING POSITION | upper-left ▼ | —722 |
|---|---|---|

723— ☑ COPY-FORGERY-INHIBITED PATTERN

| TEXT | copy inhibited | —731 |
|---|---|---|
| COLOR | black ▼ | —732 |
| ANGLE | 45 ° | —733 |
| FONT SIZE | 12 | —734 |
| PRINTING METHOD | watermark printing ▼ | —735 |

| | | |
|---|---|---|
| 751— | N-UP PRINTING | 2 |
| 752— | STAPLING | true |
| 753— | STAPLING POSITION | upper-left |
| 754— | COPY-FORGERY-INHIBITED PATTERN | true |
| 755— | TEXT | copy inhibited |
| 756— | COLOR | black |
| 757— | ANGLE | 45 |
| 758— | FONT SIZE | 12 |
| 759— | PRINTING METHOD | watermark printing |
| 761— | SMALL DOT SIZE | 4 |
| 762— | LARGE DOT SIZE | 15 |

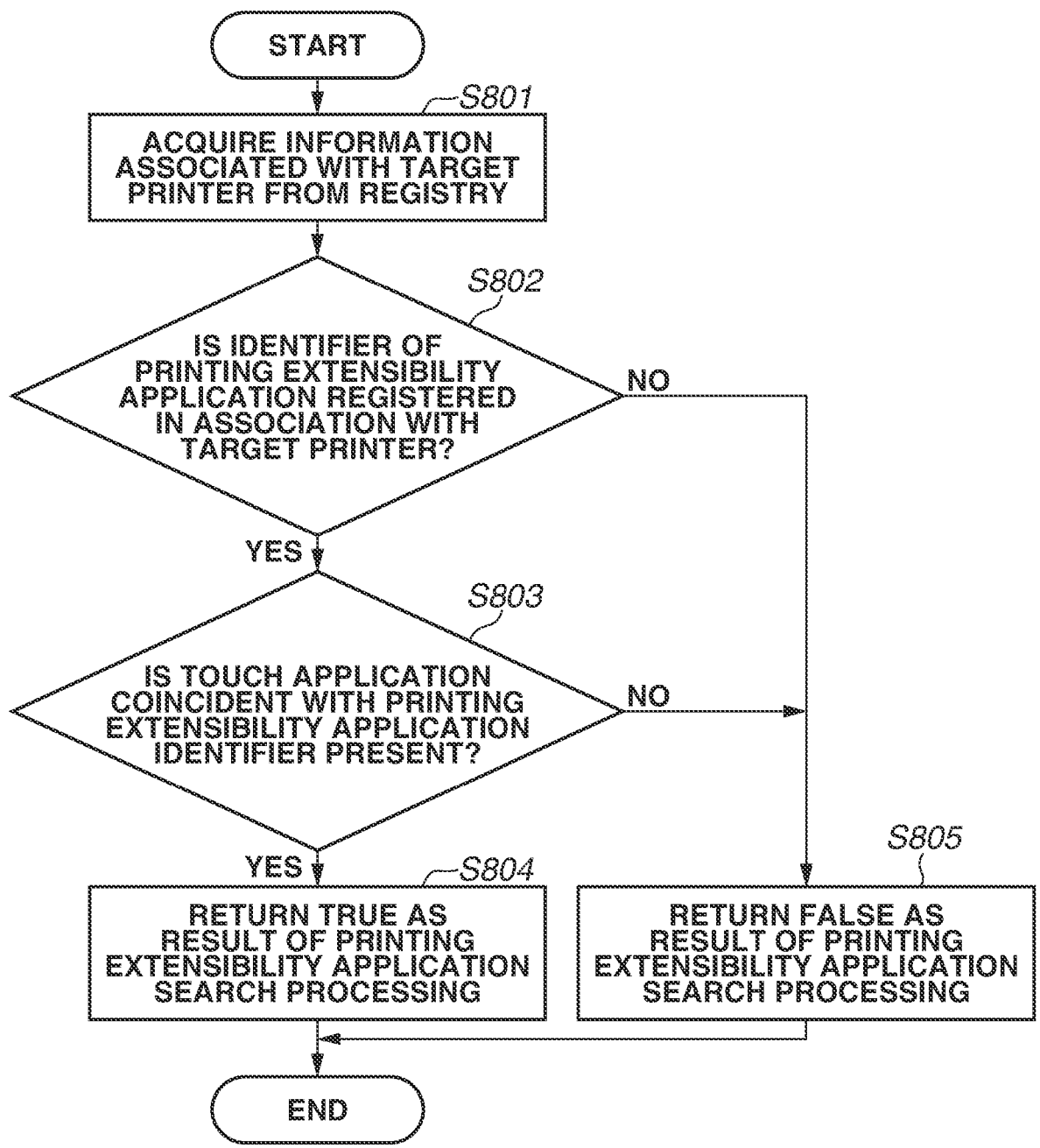

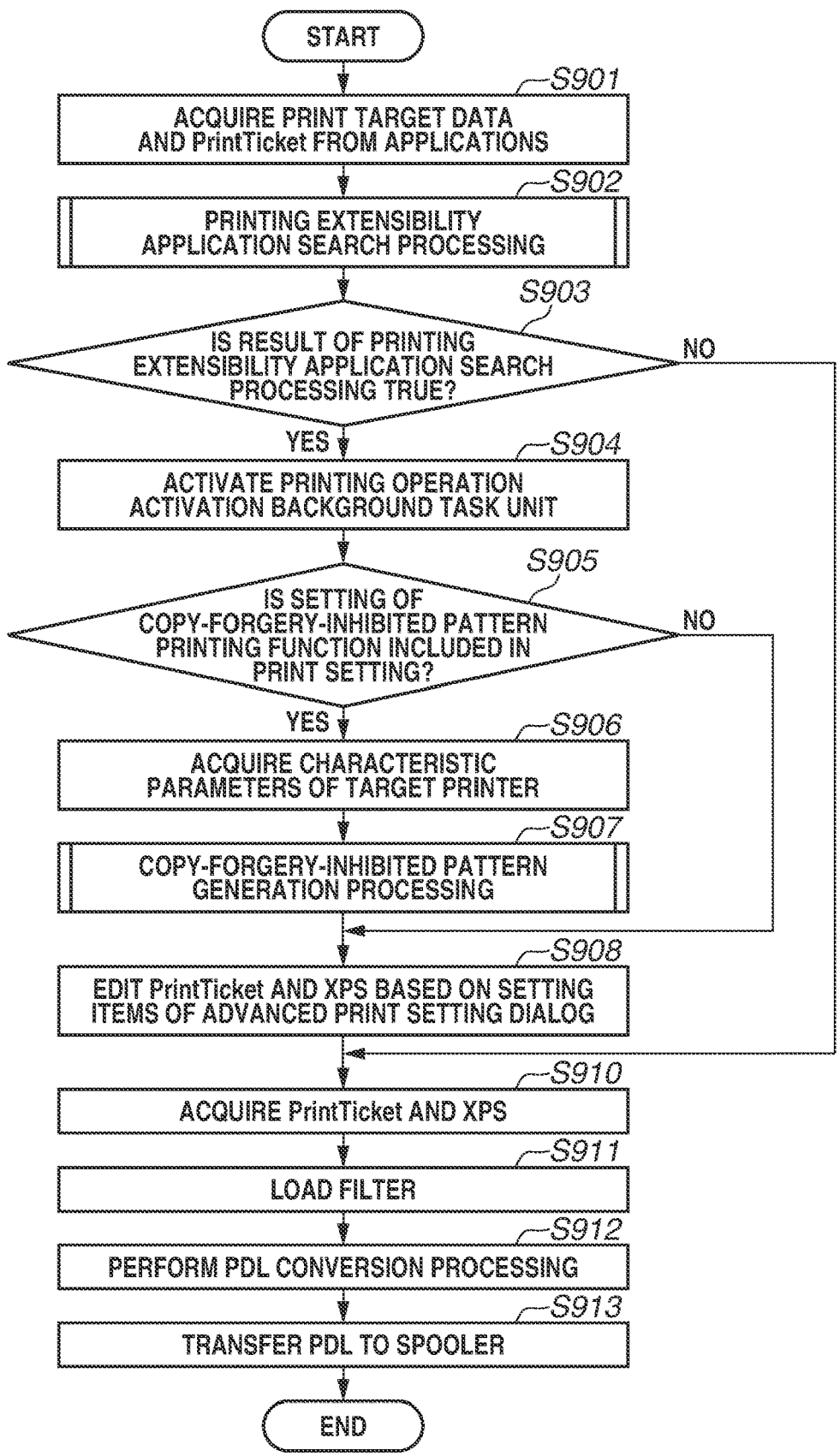

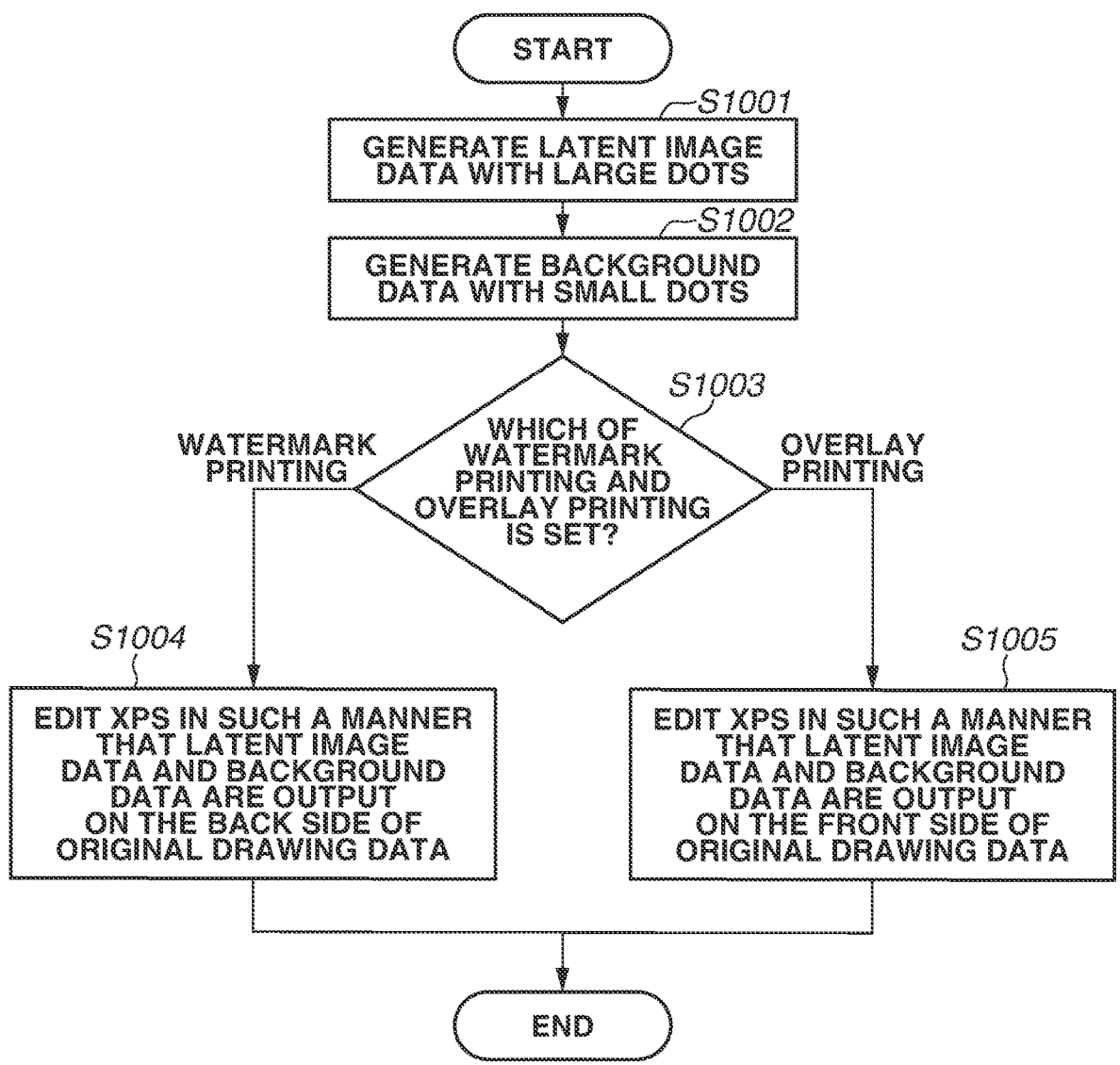

INFORMATION PROCESSING APPARATUS FOR ACQUIRING AN APPLICATION, CONTROL METHOD, AND STORAGE MEDIUM

BACKGROUND

Field of the Disclosure

Aspects of the present disclosure generally relate to an information processing apparatus which communicates with a printing apparatus, a control method for the information processing apparatus, and a storage medium for the control method.

Description of the Related Art

Configurations which transmit print data to a printing apparatus with use of a printer driver are generally known. Since an information processing apparatus has an operating system (OS), which is fundamental software, installed thereon, the printer driver is configured in conformity with print architecture which is defined by the OS, and is invoked by the OS to perform operation. Each vendor which supplies printing apparatuses provides a printer driver compatible with the specifications of an OS. The OS and the printer driver cooperate with each other to implement the function of performing printing with use of a printing apparatus as an output destination.

Furthermore, in a case where a version of the OS released previous to Windows® 8 produced by Microsoft® is used, the printer driver is configured with architecture called "V3 printer driver".

Moreover, in Windows® 8.1 and subsequent OS versions, architecture called "V4 printer driver" has been introduced. The V4 printer driver places great importance on a security feature and is, therefore, lower in scalability of a printer driver itself than the V3 printer driver. To make up for such a lowering in scalability, vendors which supply printing apparatuses are allowed to provide a dedicated application for aiding the functions of a printer driver. Such an application is called "Universal Windows Platform Device Apps (UWP Device Apps)". UWP Device Apps are able to enhance user experience obtained when printing is performed via a store application (UWP). Moreover, Printer-Extension, which is a print setting application for performing vendor-unique print settings, is able to be associated with the V4 printer driver.

Moreover, as discussed in Japanese Patent Application Laid-Open No. 2011-243067, there is a conventionally known printer driver which is referred to as a "universal printer driver" as a printer driver for controlling a plurality of types of printing apparatuses having respective different functions. Such a printer driver is able to display an operation screen which is appropriate for an individual printing apparatus of each type or model.

Additionally, enabling transmitting print data to a printing apparatus without use of any printer driver has been conceived. For example, Ubuntu® 17.04 is equipped with a scheme for transmitting print data to a printing apparatus compatible with IPP Everywhere®, as a default function of the OS. IPP Everywhere® is a series of standards which enables printing using various types of printing apparatuses, and the formulation of standards and the popularization thereof are being advanced by, for example, an industry organization.

The universal printer driver such as that discussed in Japanese Patent Application Laid-Open No. 2011-243067 is usually provided with respect to each vendor. Accordingly, one universal printer driver is able to be compatible with a plurality of types of printing apparatuses different in function which the same vendor sells. However, it is difficult for one universal printer driver to be compatible with printing apparatuses which different vendors respectively sell. This is caused by a situation in which, since communication of print data is performed via communication methods, page description languages (PDLs), or job description languages (JDLs) which are different with respect to respective vendors, it is difficult to unify such methods or languages. Moreover, there is also a situation in which, for example, with respect to print setting items, setting items are different for respective vendors or even similar setting items vary in interpretation, and, therefore, it is difficult for one universal printer driver to be compatible with such a situation.

As mentioned above, it is conceivable to provide a shared printer driver or print client using a scheme compliant with the Internet Printing Protocol (IPP) typified by, for example, IPP Everywhere. However, a shared printer driver compliant with the IPP has an issue that it is impossible to use functions which a vendor uniquely makes up and provides.

Here, one of the functions which a vendor uniquely makes up and provides is, for example, a copy-forgery-inhibited pattern printing function. The copy-forgery-inhibited pattern printing function is the function of printing, on the background or foreground of a print product, a copy-forgery-inhibited pattern in such a manner that, if the print product is copied, a specific character string or graphic emerges from a copy of the print product. Using the copy-forgery-inhibited pattern printing function enables discriminating between an original of the print product and a copy thereof, so that forgery prevention for printed products and inhibition of copying can be expected. In such a copy-forgery-inhibited pattern printing function, there is a need to appropriately generate a background image in conformity with output characteristics (characteristic parameters for each model) of a printing apparatus serving as an output destination. If all of such characteristic parameters differing for each model are stored in an extensibility application, the size of the extensibility application may be disadvantageously bloated. Moreover, there is a need to modify the extensibility application each time a new model is released, so that there is also a concern about an increase in operational cost.

SUMMARY

According to embodiments of the present disclosure, an information processing apparatus including a shared printer driver which is usable in common with respect to a plurality of different printing apparatuses includes a first acquisition unit configured to acquire, in response to receiving an instruction to add a printing apparatus which is to be used with the shared printer driver, identification information for identifying a type of the printing apparatus, and a second acquisition unit configured to acquire, with use of the identification information acquired by the first acquisition unit, information indicating a characteristic of a printing apparatus corresponding to the identification information from a server different from the printing apparatus, wherein a user interface (UI) for use in performing print setting is displayed based on the information indicating the characteristic acquired by the second acquisition unit.

Further features of the present disclosure will become apparent from the following description of exemplary embodiments with reference to the attached drawings.

BRIEF DESCRIPTION OF THE DRAWINGS

FIG. 2 is a diagram illustrating an example of a hardware configuration of a computer.

FIG. 3 is a diagram illustrating an example of a software configuration of the computer.

FIG. 4 is a flowchart illustrating an example of association between a driver and a printing extensibility application in the computer.

FIG. 5 is a schematic diagram illustrating an example of association between the driver and the printing extensibility application.

FIGS. 7A, 7B, and 7C are diagrams illustrating examples of screens which are displayed on a display of the computer and setting values which are set via the screens.

FIG. 8 is a flowchart illustrating an example of print processing in the computer.

FIG. 9 is a flowchart illustrating an example of print processing in the computer.

FIG. 10 is a flowchart illustrating an example of print processing in the computer.

DESCRIPTION OF THE EMBODIMENTS

Figure 1:
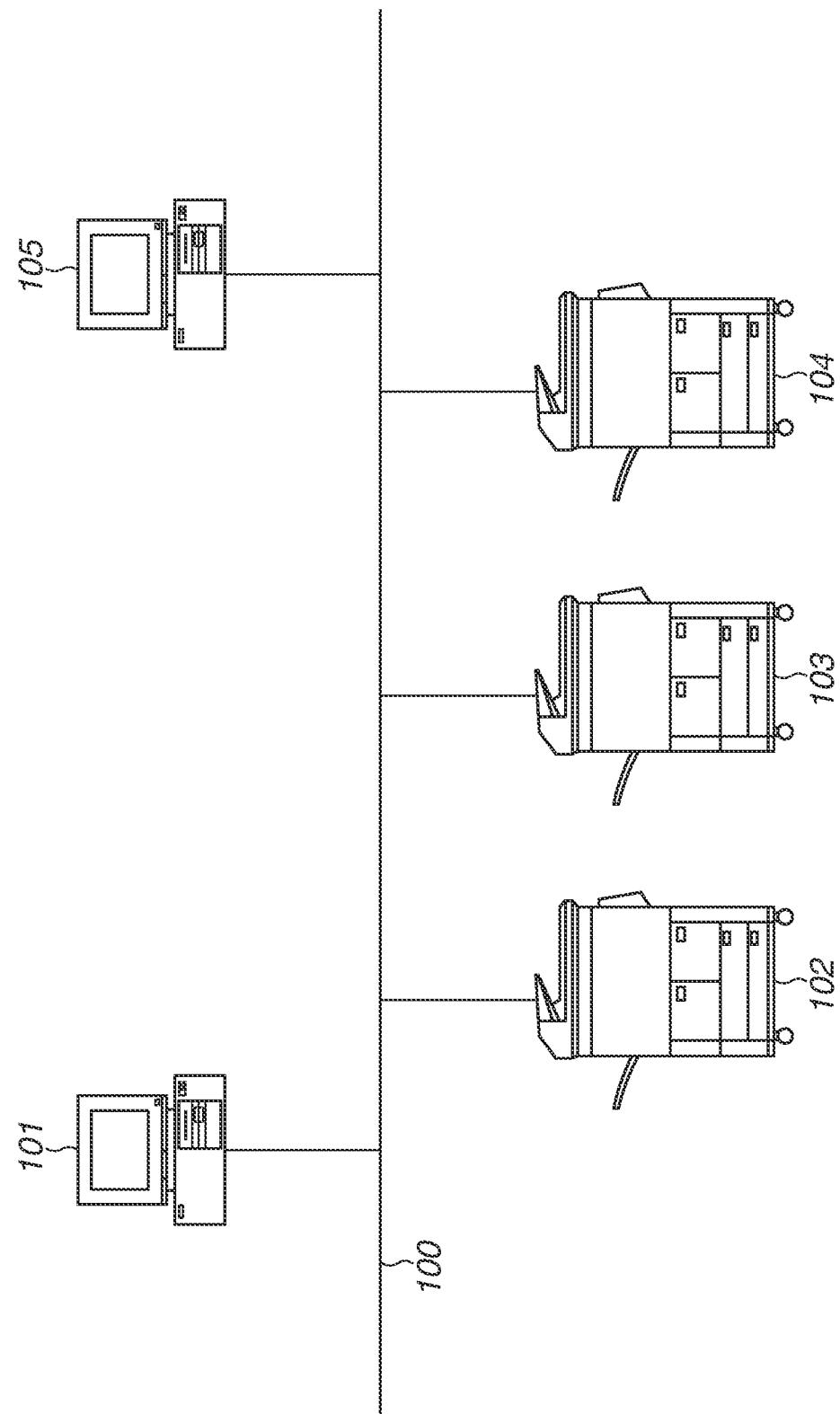
FIG. 1 is a diagram illustrating an example of a printing system.

Various exemplary embodiments, features, and aspects of the disclosure will be described in detail below with reference to the drawings. Furthermore, the following exemplary embodiments are not seen to be limited, and not all of the combinations of features described in the following exemplary embodiments are necessarily deemed to be essential.

First, a configuration of a printing system according to an exemplary embodiment of the disclosure is described with reference to FIG. 1. The printing system according to the present exemplary embodiment includes a client computer 101, which is an example of an information processing apparatus in the present exemplary embodiment, a server 105, which delivers data to the client computer 101, and printing apparatuses 102 to 104. The client computer 101, the server 105, and the printing apparatuses 102 to 104 are able to communicate with each other via a network 100, which includes a wide area network (WAN).

Furthermore, each of the printing apparatuses 102 to 104 can be a single-function printer, which is equipped with only a printing function, or can be a multifunction printer, which is equipped with a printing function, a scanning function, and a copying function. Moreover, not only one client computer 101 is connected to the network 100, but also a plurality of client computers 101 can be connected to the network 100. The printing apparatus 102 is able to receive print data of the page description language (PDL) format from outside and perform printing of the print data.

The client computer 101 is able to transmit print data to, for example, the printing apparatus 102. The server 105 is a server which delivers, to clients, for example, a package including a touch application, a printing extensibility application, a printer driver, and an extension INF. While, in the present exemplary embodiment, an example in which the server 105 provides respective packages is described, the present exemplary embodiment is not limited to this. The respective packages can be delivered by a plurality of different servers. Moreover, the server for delivering respective packages can be, for example, a cloud server.

FIG. 2 is a block diagram illustrating a hardware configuration of the client computer 101 illustrated in FIG. 1. A control unit including a central processing unit (CPU) 201 controls operations of the entire client computer 101. The CPU 201 performs various control operations by loading a program stored in a read-only memory (ROM) 203 or an external memory 209 onto a random access memory (RAM) 202 and executing the program. The RAM 202 is a main storage memory for the CPU 201, and is used as a work area or a temporary storage region used for loading various programs thereon. The ROM 203 stores, for example, control programs and a boot program which are executable by the CPU 201. The external memory 209, which is connected to the control unit via an external memory interface (I/F) 208, stores, for example, an operating system (OS) 210, a shared printer driver 211, and applications 212.

While, in the present exemplary embodiment, an auxiliary storage device such as a hard disk drive (HDD) is assumed to be used as the external memory 209, a non-volatile memory such as a solid state drive (SSD) can be used instead of an HDD. In this way, hardware including, for example, the CPU 201, the RAM 202, the ROM 203, and the external memory 209 configures what is called a computer.

An operation input device interface (I/F) 204 is an interface which controls an operation input device 205, such as a keyboard, a pointing device (mouse), or a touch input device. Operation input device 205 serves as a reception unit which receives an operation performed by the user. A display I/F 206 controls displaying on the screen of a display 207. The display 207 serves as a display unit which displays information to the user.

The client computer 101 is connected to the network 100 via a network I/F 213. The network I/F 213 transmits print data to a printing apparatus on the network 100 and receives, for example, a store application or a printer driver from the server 105 on the network 100. Furthermore, data communication to be performed with external terminals on the network 100 is wireless communication compliant with, for example, the IEEE 802.11 series, communication to be performed via a mobile communication system such as Long Term Evolution (LTE) or 5G (the fifth generation cellular network technology), or communication to be performed via a wired cable such a local area network (LAN) cable.

Next, an example of a software configuration of the client computer 101 is described with reference to FIG. 3. First, operation software included in the client computer 101 is described. Software included in the client computer 101 includes an OS 210 and applications 212.

First, individual elements which constitute the OS 210 are described. The OS 210 performs management control over the client computer 101. The OS 210 in the present exemplary embodiment includes a printing system 300, a printer driver storage region 310, and an external setup file group 320.

The printing system 300 includes a print queue 301, a spooler 302, a filter pipeline manager 303, a configuration module 304, and a printing operation activation application launcher 305.

The print queue 301 is a region in which to temporarily store a print job when printing is performed with use of a printing apparatus present on the network 100, and can be a plurality of print queues. In the present exemplary embodiment, for the purpose of illustration, print queues 301 which respectively correspond to the printing apparatuses 102 to 104 are assumed to be generated.

The spooler 302 is a module which temporarily stores and manages an XML Paper Specification (XPS) file, which is print target data generated by any application included in the applications 212. An XPS file stored in the spooler 302 is converted into a page description language (PDL) via the filter pipeline manager 303, and is then transmitted to a printing apparatus via the spooler 302.

The filter pipeline manager 303 is a module which loads one or more filters 311 and then converts an XPS file into a PDL file. The filter pipeline manager 303 is configured as a part of a printing architecture which the OS 210 provides.

The OS 210 reads in one or more filters 311, each of which is one of elements which constitute the shared printer driver 211, based on the definition of a filter configuration 312, and generates a PDL with use of the read-in filters 311. The PDL to be employed can include, for example, Printer Command Language (PCL) and Portable Document Format (PDF).

The configuration module 304 is a module which generates or changes a PrintTicket. Moreover, the configuration module 304 has a constraint rule function which prevents settings that are not allowed to be combined with each other from being performed. Moreover, the configuration module 304 manages PrintCapabilities, which is capability information about a printer. Each of an advanced print setting user interface (UI) unit 352, a printing operation activation background task unit 353, and a printing operation activation UI unit 354 of a printing extensibility application 350 is able to invoke an application programming interface (API) which the configuration module 304 provides. Upon invoking the API, each of the advanced print setting UI unit 352, the printing operation activation background task unit 353, and the printing operation activation UI unit 354 is able to acquire PrintTicket or PrintCapabilities of the Extensible Markup Language (XML) format. The shared printer driver 211 provides, to the OS 210, a device function text file group 313, in which a constraint rule indicating a combination of mutually contradictory print settings and the functions of respective devices are described, and a script file group 314. Each of the device function text file group 313 and the script file group 314 contains files which are different for respective printing apparatuses serving as a destination for printing operation. In other words, operations of the configuration module 304 are customized based on files selected from among the device function text file group 313 and the script file group 314.

The printing operation activation application launcher 305 is a module which controls execution of a background task which, for example, the printing operation activation background task unit 353 provides. When printing is performed in response to the OS 210 detecting a printing start instruction being input by the user, the printing operation activation application launcher 305 activates the printing operation activation background task unit 353. Furthermore, in a case where a setting which disables activation of a background task is stored in a registry 322, the OS 210 refrains from executing the background task.

The printer driver storage region 310 is a region in which printer drivers, such as the shared printer driver 211, are stored. Furthermore, while, in the present exemplary embodiment, a case where the shared printer driver 211 is previously installed is described as an example, in addition to the shared printer driver 211, other printer drivers can be previously installed. The shared printer driver 211 includes filters 311, a filter configuration 312, a device function text file group 313, a script file group 314, and an INF group 315. Furthermore, in the present exemplary embodiment, the filters 311 and the filter configuration 312 are used in common even when any printing apparatus is used. On the other hand, each of the file groups 313 and 314 and the INF groups 315 is stored as files which are different for the respective printing apparatuses serving as a destination for printing operation. The shared printer driver 211 switches files which the configuration module 304 uses, according to a printer serving as a destination for printing operation selected by the user. Furthermore, in the present exemplary embodiment, the shared printer driver 211 is assumed to be a universal printer driver, which is compatible with printing apparatuses of a plurality of vendors, and is assumed to be able to independently perform print setting compliant with the Internet Printing Protocol (IPP). While, in the present exemplary embodiment, it is supposed that the shared printer driver 211 is a driver installed by the user, the present exemplary embodiment is not limited to this. For example, the shared printer driver 211 can be a driver pre-installed in the OS 210.

The filters 311 are filters which are invoked by the filter pipeline manager 303, and have the function of converting the input XPS file into a PDL and outputting the PDL. The filter configuration 312 is a definition file which the filter pipeline manager 303 refers to, and in which the sequence of invoking one or more filters 311 is described. The device function text file group 313 and the script file group 314 are files which are invoked by the configuration module 304, and are able to be used to customize operations of the configuration module 304. The INF group 315 is a text file in which setup information for setting up the shared printer driver 211 is described.

Here, as mentioned above, it is conceivable to provide a shared printer driver or print client using a scheme compliant with the IPP typified by, for example, PP Everywhere. However, a shared printer driver which is compatible with printing apparatuses of a plurality of vendors is configured to use only print setting compliant with the IPP, and has an issue that it is impossible to use functions which a vendor uniquely makes up and provides.

In view of the above issue, it is also conceivable to associate an extensibility application for performing vendor-unique print setting with such a shared printer driver.

Furthermore, one of the functions which a vendor uniquely makes up and provides is, for example, a copy-forgery-inhibited pattern printing function. The copy-forgery-inhibited pattern printing function is the function of printing, on the background or foreground of a print product, a copy-forgery-inhibited pattern in such a manner that, if the print product is copied, a specific character string or graphic emerges from a copy of the print product. Using the copy-forgery-inhibited pattern printing function enables discriminating between an original of the print product and a copy thereof, so that forgery prevention for printed products and inhibition of copying can be expected. In such a copy-forgery-inhibited pattern printing function, there is a need to appropriately generate a background image in conformity with output characteristics (characteristic parameters for each model) of a printing apparatus serving as an output destination. If all of such characteristic parameters differing for each model are stored in an extensibility application, the size of the extensibility application may be disadvantageously bloated. Moreover, there is a need to modify the extensibility application each time a new model is released, so that there is also a concern about an increase in operational cost.

In consideration of this, when adding a printing apparatus which is used with a shared printer driver, the present exemplary embodiment enables appropriately providing characteristic parameters of the printing apparatus to an extensibility application corresponding to the printing apparatus. Such a configuration is specifically described as follows.

Referring back to the description of FIG. 3, the external setup file group 320 includes metadata 321 and a registry 322.

The metadata 321 is definition information having both identifiers, i.e., a printing extensibility application identifier of the printing extensibility application 350 and a Hardware Identifier (HWID) of a print queue which the V4 printer driver uses, and has the role of associating the identifiers with each other.

The registry 322 is a region for a registry database in which a setting group of the OS 210 is described. In the registry 322, values are allowed to be described in a Key and Value method and setting for each print queue 301 is able to be described. In the registry 322, setting of a policy indicating whether to enable or disable activation of a background task performed by the printing operation activation application launcher 305 and a correspondence relationship between the identifier of the printing extensibility application 350 associated with the shared printer driver 211 and the HWID of the printer are registered. Settings registered in the registry 322 are able to be referred to and to be changed via the setting screen of the OS 210.

Next, individual elements which constitute the applications 212 are described. The applications 212 include a desktop application 330, a touch application 340, and a printing extensibility application 350.

The desktop application 330 is an application which operates under an execution environment for desktop of the OS 210. With regard to the desktop application 330, restrictions and an official market, which are present with regard to the touch application 340, are not present.

The touch application 340 is an application which operates under an execution environment for touch application of the OS 210. The touch application 340 is downloaded via an official market serving as an application distribution system published on the Internet, and is then installed on the client computer 101. In the touch application 340, a required module group is packaged and signed, and invocation of the API in the OS 210 is restricted.

The printing extensibility application 350 is one type of touch application 340, and operates under an execution environment for touch application of the OS 210 as with the touch application 340. The printing extensibility application 350 is an application which the OS 210 acquires from an official market serving as an application distribution system via the Internet. Moreover, the printing extensibility application 350 in the present exemplary embodiment has a printing operation UI display function for displaying a uniquely customized UI during a printing operation. The printing extensibility application 350 is able to be associated with a printer driver provided by a printer vendor via the metadata 321. Moreover, in a case where the printing extensibility application 350 is associated with the shared printer driver 211, which is used in common with respect to printing apparatuses provided by a plurality of vendors, the printing extensibility application 350 is associated with the shared printer driver 211 via the registry 322. The association between the shared printer driver 211 and the printing extensibility application 350 is described below with reference to the flowchart of FIG. 4.

The printing extensibility application 350 includes a tile application unit 351, an advanced print setting UI unit 352, a printing operation activation background task unit 353, a printing operation activation UI unit 354, an application save area 355, a setup file 356, and a custom setup file 357.

The tile application unit 351 is executed in response to receiving a user operation for activating the printing extensibility application 350, and provides the function of, for example, displaying the status of a registered printing apparatus. The advanced print setting UI unit 352 is executed in response to receiving an advanced print setting event issued by the OS 210. The advanced print setting UI unit 352 generates a UI for print setting based on PrintTicket and PrintCapabilities acquired from the configuration module 304 via the API and displays the acquired UI for print setting. The printing operation activation UI unit 354 is able to change setting of PrintTicket as appropriate according to a user operation and to return the PrintTicket to the configuration module 304.

The printing operation activation background task unit 353 is a component corresponding to a background task which is to be executed when a print event is issued. The printing operation activation background task unit 353 is able to acquire and read and write PrintTicket via the API of the configuration module 304. Moreover, it is predetermined that, in the case of using a workflow (WF) function, the printing operation activation background task unit 353 determines whether to activate the printing operation activation UI unit 354 and, as needed, requests the OS 210 to activate the printing operation activation UI unit 354, which is a component for a foreground task. Additionally, the printing operation activation background task unit 353 is able to perform delivery and receipt of values with respect to the printing operation activation UI unit 354 by performing reading and writing of values with respect to the application save area 355. When the printing operation activation background task unit 353 determines not to activate the printing operation activation UI unit 354, the printing operation activation application launcher 305 performs generation of print data without activating the printing extensibility application 350.

The setup file 356 is a file in which setting values of the printing extensibility application 350 are described. In the setup file 356, a printing extensibility application identifier which uniquely indicates the printing extensibility application 350 and a custom setup file 357 which is to be used are described. The custom setup file 357 is a setup file in which setting of services that the printing extensibility application 350 is able to use with respect to the shared printer driver 211 is described.

<Association Between Shared Printer Driver and Printing Extensibility Application>

A sequential flow for associating the shared printer driver 211 and the printing extensibility application 350 with each other during installation of the printer driver is described with reference to FIG. 4 and FIG. 5. FIG. 4 is a flowchart illustrating a sequential flow for associating the shared printer driver 211 and the printing extensibility application 350 with each other. Moreover, FIG. 5 is a schematic diagram illustrating association between the shared printer driver 211 and the printing extensibility application 350. Each operation illustrated in the flowchart of FIG. 4 is implemented by the OS 210 loading a program for implementing modules, components, and applications stored in the external memory 209 onto the RAM 202 and the CPU 201 executing the program. The flowchart of FIG. 4 is performed, for example, when the CPU 201 has detected a user operation for adding a printing apparatus which is used via the shared printer driver 211.

In step S401, the OS 210 makes an inquiry into the network 100 by multicast, thus searching for a printing apparatus compatible with the shared printer driver 211. Searching can be performed with use of, for example, Bonjour or Web Services for Devices (WSD).

In step S402, the OS 210 receives a response to the inquiry made in step S401. Then, the OS 210 displays a printer list for selecting a printer targeted for addition based on the response. Here, for the purpose of illustration, suppose that printing apparatuses 102 to 104 have been found by searching and the printing apparatus 102 and the printing apparatus 104 are displayed in the printer list. Suppose that the printing apparatus 103 is already associated with the shared printer driver 211 in such a way as to be able to be used via the shared printer driver 211. Accordingly, the OS 210 performs control not to display the printing apparatus 103 in the printer list for selecting a printing apparatus targeted for addition.

Next, in step S403, the OS 210 receives a user operation for selecting a target printer from among the printer list displayed in step S402. Here, for the purpose of illustration, the printing apparatus 102 is assumed to be selected.

In step S404, the OS 210 performs setup processing of the shared printer driver 211 to enable performing printing with use of the target printer selected in step S403. In the setup processing in step S404, setting of a print port and capability setting of a printer that is based on print attribute information compliant with the IPP acquired from the target printer are performed. Performing processing in steps S401 to S404 enables using a printing apparatus via the shared printer driver 211. Processing in step S405 and subsequent steps is a control operation to extend the shared printer driver 211 with a printing extensibility application.

Next, in step S405, the OS 210 acquires an HWID, which is identification information for identifying a printing apparatus, from the target printer. The HWID as acquired here is an identifier which differs according to the type or model of a printing apparatus, and is identification information used to specify the type of a printing apparatus. In a case where the printing apparatus 102 has been selected, "XXX" is acquired.

In step S406, the OS 210 generates a basic extension INF in which the acquired HWID is described. Processing in step S406 is described with reference to FIG. 5.

The OS 210 generates a basic extension INF, in which the HWID of a printing apparatus is added, based on a basic INF, which is a default template. In a case where the printing apparatus 102 has been selected as a target printer, a basic extension INF 506 in which the HWID "XXX" is written is generated. Furthermore, at that time, the identifier of a printing extensibility application is not yet subjected to association.

Next, in step S407, the OS 210 determines whether an extension INF package in which the HWID acquired in step S405 is described is present in the server 105 or a predetermined directory. First, the OS 210 makes a search as to whether an extension INF package in which the HWID is described is present in a predetermined directory of the client computer 101, thus determining whether the extension INF package is present based on a result of the search. If it is determined that an extension INF package in which the HWID acquired in step S405 is described is present in the client computer 101 (YES in step S407), the OS 210 advances the processing to step S408. If it is determined that the extension INF package is not present in the client computer 101, then, the OS 210 makes an inquiry, to the server 105, as to whether an extension INF package in which the HWID is described is present in the server 105. In response to the inquiry, the server 105 determines whether the corresponding extension INF package is being managed, and sends a result of determination as a reply. The OS 210 determines whether the corresponding extension INF package is present, based on the result of determination. Furthermore, the server 105 is managing extension INF packages of various vendors. A vendor which wants to associate a printing extensibility application with the shared printer driver 211 is able to previously register an extension INF package with the server 105.

If it is determined that the extension INF package is present in the server 105 (YES in step S407), the OS 210 advances the processing to step S408. On the other hand, if it is determined that the corresponding extension INF package is present in neither the predetermined directory nor the server 105 (NO in step S407), the OS 210 does not perform association of the printing extensibility application 350 and then completes addition processing for a printing apparatus. For example, in the case of the printing apparatus 104, no extension INF package is prepared. Accordingly, in a case where the target printer is the printing apparatus 104, the OS 210 completes the setup processing without performing association of an extension INF package.

Referring back to the description of FIG. 4, in step S408, the OS 210 acquires the corresponding extension INF package from the predetermined directory or the server 105. The extension INF package includes an extension INF, a device function text file, and a script file. For example, an extension INF package 510 corresponding to the printing apparatus 102 illustrated in FIG. 5 includes an extension INF 515, a device function text file 513, and a script file 514. Moreover, an extension INF package 520 corresponding to the printing apparatus 103 includes an extension INF 525, a device function text file 523, and a script file 524.

Characteristic parameters which differ according to the type of a printing apparatus are able to be stored in a device function text file and a script file included in the extension INF package.

For example, a copy-forgery-inhibited pattern parameter which is needed to use the copy-forgery-inhibited pattern printing function is included in the device function text file 513. Moreover, characteristic parameters, such as a constraint rule condition indicating a combination of print settings which causes a problem specific to a printing apparatus, are included in the script file 514. For example, depending on output characteristics of a print engine, if a low resolution and a copy-forgery-inhibited pattern printing function are combined with each other, there may be a case where it is impossible to appropriately print hidden information. A rule for performing control to prevent such a combination is included in the script file 514. Moreover, characteristic parameters included in each extension INF package are merely examples, and can further include a wide variety of parameters for enabling a printing apparatus to perform more appropriate printing. For example, the characteristic parameters can include a color profile for performing color matching and a characteristic parameter such as a dither matrix for use in halftone processing.

In step S409, the OS 210 updates the original basic extension INF with an extension INF included in the acquired extension INF package. In a case where the target printer is the printing apparatus 102, a basic extension INF 506 generated by the OS 210 as an INF for the printing apparatus 102 is updated with the content of the extension INF 515 included in the extension INF package 510.

Next, in step S410, the OS 210 performs extension setup processing on the target printer based on the basic extension INF updated in step S409 and the extension INF package acquired in step S408. For example, in a case where the target printer is the printing apparatus 102, the OS 210 overwrites or extends a script file associated with the target printer with the script file 514 included in the acquired extension INF package 510, and stores the overwritten or extended script file in the script file group 314. Moreover, the OS 210 overwrites or extends an original device function text file with the device function text file 513 included in the acquired extension INF package 510, and stores the overwritten or extended device function text file in the device function text file group 313.

Moreover, the OS 210 performs association between the printing extensibility application 350 and the shared printer driver 211 based on the basic extension INF 506. Such association is described with reference to FIG. 5. In a case where a compatible printing extensibility application 350 is installed on the client computer 101, the OS 210 registers, with the registry 322, information in which the HWID and the identifier of the printing extensibility application are associated with each other. Furthermore, in a case where a compatible printing extensibility application 350 is not installed on the client computer 101, the OS 210 transmits, to the server 105, an application acquisition request containing the identifier of a printing extensibility application included in the basic extension INF 506. The server 105, having received the application acquisition request, delivers an install package for a compatible printing extensibility application to the client computer 101. After completing the installation of the delivered printing extensibility application, the OS 210 registers, with the registry 322, information in which the HWID and the identifier of the installed printing extensibility application are associated with each other.

With a series of these processing operations, identification information about a printing apparatus which the user wants to use and information for uniquely identifying a printing extensibility application which is to be used are registered. Moreover, characteristic parameters of the printing apparatus are written in the respective file groups. These characteristic parameters written in the respective file groups are written in a region which the printing extensibility application is able to access in processing described below, and becomes able to be referred to by the printing extensibility application.

Furthermore, in FIG. 4 and FIG. 5, a case where one shared printer driver 211 includes file groups 313 and 314 directed at a plurality of printing apparatuses and the respective files are switched to be compatible with the plurality of printing apparatuses has been described as an example. However, the method of implementing the shared printer driver 211 is not limited to this. For example, a default template for the shared printer driver 211 can be previously prepared, and installation processing of the shared printer driver 211 can be performed for a new printing apparatus based on the default template. In this case, new installation of a shared printer driver is performed instead of processing in step S404. Moreover, instead of processing in steps S409 and S410, extension setting processing is performed on the newly installed shared printer driver.

<Print Control>

Figure 6B:
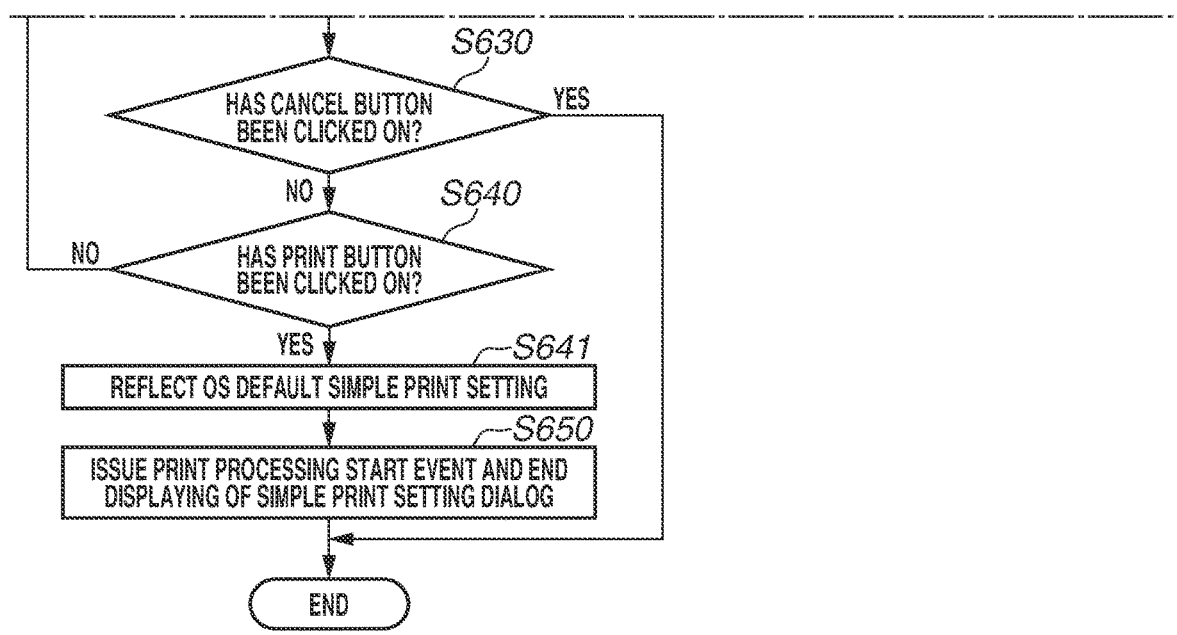
FIG. 6, which is composed of FIGS. 6A and 6B, is a flowchart illustrating an example of print processing in the computer.

Next, print control using the shared printer driver 211 is described with reference to FIG. 6, which is composed of FIGS. 6A and 6B, to FIG. 10. FIG. 6 and FIG. 8 to FIG. 10 are flowcharts illustrating print control performed in the client computer 101. FIGS. 7A, 7B, and 7C illustrate examples of operation screens which are displayed on the display 207. Each operation illustrated in the flowcharts of FIG. 6 and FIG. 8 to FIG. 10 is implemented by the OS 210 loading a program for implementing modules, components, and applications stored in the external memory 209 onto the RAM 202 and the CPU 201 executing the program. Furthermore, to clarify the agent for processing, as needed, the respective modules, components, and applications are used as the subject in the following description.

In step S601, the OS 210 receives a print setting display event. The print setting display event is issued by the user executing a print command on an application having a print output function. In step S602, the OS 210 displays a simple print setting dialog 700. FIG. 7A illustrates an example of the simple print setting dialog 700, which is displayed on the display 207. The simple print setting dialog 700 allows setting to be performed with use of a printing apparatus setting 701, a paper size setting 702, and a number-of-copies setting 703, which are used for printing. An advanced setting button 705 is a button which is used to display the UI of the advanced print setting UI unit 352, which the printing extensibility application 350 provides. A print button 710 is a button which is used to start printing after completion of print setting. A cancel button 711 is a button which is used to stop print setting. Hereinafter, in the present exemplary embodiment, for the purpose of illustration, a printing apparatus which is used for printing set via the simple print setting dialog 700 is referred to as a "target printer". More, the printing apparatus 102 is assumed to be selected as the target printer in the following description.

Referring back to the description of FIG. 6, in step S603, the OS 210 receives a user operation performed via the simple print setting dialog 700. In step S604, the OS 210 determines whether the advanced setting button 705 has been clicked on. If, in step S604, it is determined that the advanced setting button 705 has been clicked on (YES in step S604), the OS 210 advances the processing to step S605, and, if it is determined that the advanced setting button 705 has not been clicked on (NO in step S604), the OS 210 advances the processing to step S630.

In step S605, the OS 210 performs printing extensibility application search processing. The printing extensibility application search processing in step S605 is described below. In step S606, the OS 210 determines whether the result of the printing extensibility application search processing in step S605 is true. If, in step S606, it is determined that the result of the printing extensibility application search processing in step S605 is true (YES in step S606), the OS 210 advances the processing to step S607, and, if in step S606, it is determined that the result of the printing extensibility application search processing in step S605 is not true (NO in step S606), the OS 210 advances the processing to step S620.

In step S607, the OS 210 activates a printing extensibility application associated with the target printer. Specifically, the OS 210 determines an application which is to be activated, based on the identifier of the printing extensibility application 350 included in the result of search processing in step S605, and then activates the determined application. Furthermore, in the present exemplary embodiment, printing extensibility applications which are provided by vendors are assumed to be stored in a predetermined folder, and a printing extensibility application which is to be activated is assumed to be able to be uniquely determined based on an identifier. However, the present exemplary embodiment is not limited to this, and, for example, the result of search processing in step S605 can be configured to include a Uniform Resource Identifier (URI) or a file path used for activating a printing extensibility application. In this case, the OS 210 activates the printing extensibility application with use of the URI or file path.

In step S608, the printing extensibility application 350, which has been activated by the OS 210, displays an advanced print setting dialog 720. The advanced print setting UI unit 352 displays the advanced print setting dialog 720 based on PrintTicket and PrintCapabilities generated based on function text files for the target printer included in the file groups 313 and 314. FIG. 7B illustrates an example of the advanced print setting dialog 720 of the printing extensibility application 350. The user is allowed to perform settings about N-up printing 721, stapling 722, and copy-forgery-inhibited pattern printing 723 via the advanced print setting dialog 720 of the printing extensibility application 350.

Setting values which are able to be set about the copy-forgery-inhibited pattern printing 723 include text 731, which indicates a character string to be printed as a copy-forgery-inhibited pattern, color 732 of the copy-forgery-inhibited pattern to be printed, angle 733 of the character string to be printed as a copy-forgery-inhibited pattern with respect to a sheet of paper, and font size 734 of the character string to be printed as a copy-forgery-inhibited pattern. Moreover, printing method 735 enables selecting watermark printing, which prints a copy-forgery-inhibited pattern as a background of original drawing data, and overlay printing, which performs printing by overwriting a copy-forgery-inhibited pattern on original drawing data. An OK button 740 is configured to be clicked on to return to the simple print setting dialog 700 after completion of the advanced print setting of the printing extensibility application 350. Furthermore, while, in the present exemplary embodiment, a character string is used as an example of a copy-forgery-inhibited pattern, the present exemplary embodiment is not limited to this. For example, a configuration in which a drawing object such as a stamp indicating a confidential document is able to be embedded as hidden information can be employed.

Referring back to the description of FIG. 6, in step S609, the printing extensibility application 350 receives a user operation performed via the advanced print setting dialog 720. In step S610, the printing extensibility application 350 determines whether the OK button 740 being clicked on has been detected. If, in step S610, it is determined that the OK button 740 being clicked on has been detected (YES in step S610), the printing extensibility application 350 advances the processing to step S611, and, if it is determined that the OK button 740 being clicked on has not been detected (NO in step S610), the printing extensibility application 350 waits for a further print setting operation to be received.

Next, in step S611, the printing extensibility application 350 stores the print setting set via the advanced print setting dialog 720 in the application save area 355. Here, characteristic parameters (for example, copy-forgery-inhibited pattern parameters) described in a device function text file compatible with the target printer are also stored as with the print setting. Moreover, the printing extensibility application 350 updates PrintTicket with the print setting set via the advanced print setting dialog 720. After completing the update processing, the printing extensibility application 350 advances the processing to step S612.

FIG. 7C illustrates an example of data 750 which is stored in the application save area 355. Values set via the advanced print setting dialog 720 of the printing extensibility application 350 are stored in a data item 751 to a data item 759. Moreover, small dot size 761 and large dot size 762, which are parameters about the copy-forgery-inhibited pattern printing function, are stored as characteristic parameters described in the device function text file. FIG. 7C illustrates an example in a case where the target printer is the printing apparatus 102.

Referring back to the description of FIG. 6, in step S612, the OS 210 ends displaying of the advanced print setting dialog 720 of the printing extensibility application 350, and returns focus of control to the simple print setting dialog 700.

Next, processing which is performed in a case where there is no associated printing extensibility application is described. In step S620, the OS 210 displays an OS default advanced print setting dialog. The OS default advanced print setting dialog is a dialog via which only setting items defined by the IPP are able to be set. Setting about a copy-forgery-inhibited pattern printing function is assumed to be unable to be performed via such a printing dialog. In step S621, the OS 210 receives a user operation performed via the OS default advanced print setting dialog. In step S622, the OS 210 determines whether an OK button in the OS default advanced print setting dialog being clicked on has been detected. If, in step S622, it is determined that the OK button being clicked on has been detected (YES in step S622), the OS 210 advances the processing to step S623, and, if it is determined that the OK button being clicked on has not been detected (NO in step S622), the OS 210 waits for a further print setting operation to be received.

In step S623, the OS 210 updates PrintTicket with the print setting performed via the OS default advanced print setting dialog. In step S624, the OS 210 ends displaying of the OS default advanced print setting dialog, and returns focus of control to the simple print setting dialog 700.

In step S630, the OS 210 determines whether the cancel button 711 being clicked on has been detected. If, in step S630, it is determined that the cancel button 711 being clicked on has been detected (YES in step S630), the OS 210 stops the print setting, and thus stops a series of print processing operations. If, in step S630, it is determined that the cancel button 711 being clicked on has not been detected (NO in step S630), the OS 210 advances the processing to step S640.

In step S640, the OS 210 determines whether the print button 710 being clicked on has been detected. If, in step S640, it is determined that the print button 710 being clicked on has been detected (YES in step S640), the OS 210 advances the processing to step S641, and, if it is determined that the print button 710 being clicked on has not been detected (NO in step S640), the OS 210 returns the processing to step S603, thus waiting for a further print setting operation to be received.

Next, in step S641, the OS 210 updates PrintTicket with the print setting set via the simple print setting dialog 700. Finally, in step S650, the OS 210 issues a print processing start event and ends displaying of the simple print setting dialog 700. Print processing which is triggered by the print processing start event being issued is described below with reference to the flowcharts of FIG. 9 and FIG. 10.

Next, the printing extensibility application search processing in step S605 is described with reference to the flowchart of FIG. 8.

In step S801, the OS 210 refers to the registry 322 and acquires information associated with the print queue 301 of the target printer selected by the user.

In step S802, the OS 210 determines whether a printing extensibility application identifier is registered in association with the target printer. If, in step S802, it is determined that a printing extensibility application identifier is registered (YES in step S802), the OS 210 advances the processing to step S803, and, if in step S802, it is determined that no printing extensibility application identifier is registered (NO in step S802), the OS 210 advances the processing to step S805.

In step S803, the OS 210 checks all of the touch applications 340 installed on the client computer 101 to determine whether a touch application coincident with the printing extensibility application identifier is present. If, in step S803, it is determined that a touch application coincident with the printing extensibility application identifier is present (YES in step S803), the OS 210 advances the processing to step S804, and, if it is determined that no touch application coincident with the printing extensibility application identifier is present (NO in step S803), the OS 210 advances the processing to step S805.

In step S804, the OS 210 determines that a printing extensibility application 350 associated with the print queue 301 is present, and returns true as a result of the printing extensibility application search processing. This result of the printing extensibility application search processing also includes an identifier used for activating the printing extensibility application.

On the other hand, in step S805, the OS 210 determines that no printing extensibility application 350 associated with the print queue 301 is present, and returns false as a result of the printing extensibility application search processing.

Furthermore, while, in the present exemplary embodiment, a case where an identifier used for activating the printing extensibility application is included in a result of the printing extensibility application search processing has been described as an example, the present exemplary embodiment is not limited to this. For example, a URI or a file path used for activating the printing extensibility application can be included in a result of the printing extensibility application search processing.

<Print Control after Printing Instruction>

Next, print processing that is based on the print processing start event issued in step S650 is described with reference to the flowcharts of FIG. 9 and FIG. 10. The flowchart of FIG. 9 is a flowchart which is performed according to the print processing start event being issued by the processing in step S650.

In step S901, the OS 210 receives print target data of the XPS format and PrintTicket from the applications 212, and temporarily stores the received print target data and PrintTicket in the spooler 302.

In step S902, the OS 210 performs printing extensibility application search processing. The printing extensibility application search processing in step S902 is similar to the processing in step S605, and is, therefore, omitted from description here.

In step S903, the OS 210 determines whether a result of the printing extensibility application search processing in step S902 is true. If, in step S903, it is determined that the result of the printing extensibility application search processing in step S902 is true (YES in step S903), the OS 210 advances the processing to step S904, and, if it is determined that the result of the printing extensibility application search processing in step S902 is not true, i.e., is false (NO in step S903), the OS 210 advances the processing to step S910.

In step S904, the OS 210 activates the printing operation activation background task unit 353 of the printing extensibility application 350 via the printing operation activation application launcher 305. Moreover, the OS 210 delivers the print target data of the XPS format and PrintTicket received in step S901 to the printing operation activation background task unit 353.

In step S905, the printing operation activation background task unit 353 determines whether setting of the copy-forgery-inhibited pattern printing function is included in the print setting. The printing operation activation background task unit 353 refers to data stored in the application save area 355 via the printing extensibility application 350 and, according to whether a true value is stored in the data item 754, determines whether setting of the copy-forgery-inhibited pattern printing function is included in the print setting. If it is determined that setting of the copy-forgery-inhibited pattern printing function is included in the print setting (YES in step S905), the OS 210 advances the processing to step S906, and, if it is determined that setting of the copy-forgery-inhibited pattern printing function is not included in the print setting (NO in step S905), the OS 210 advances the processing to step S908.

In step S906, the OS 210 acquires characteristic parameters of the target printer stored in the application save area 355 via the printing extensibility application 350. Here, the OS 210 is assumed to acquire parameters about copy-forgery-inhibited pattern printing from the data item 755 to the data item 758 stored in the application save area 355.

Next, in step S907, the printing extensibility application 350 performs copy-forgery-inhibited pattern generation processing by editing the XPS serving as print target data. FIG. 10 is a flowchart illustrating processing in step S907.

In step S1001, the printing extensibility application 350 generates latent image data, which is a hidden pattern, based on the data item 755 to the data item 758 and the large dot size 762. The latent image data is data in which the inside of a region expressed by a character string specified by the data item 755, the inclination specified by the data item 757, and the font specified by the data item 758 is stippled with the dot size specified by the large dot size 762 and the color specified by the data item 756 in such a way as to have a predefined density. Furthermore, in a case where a drawing object such as a stamp is embedded, the printing extensibility application 350 is assumed to generate latent image data, which is a hidden pattern, by rotating, for example, a previously registered stamp as appropriate.

Next, in step S1002, the printing extensibility application 350 generates background data based on the data item 755 to the data item 758 and the small dot size 761. The background data is data in which a region other than the latent image region is stippled with the dot size specified by the small dot size 761 and the color specified by the data item 756 in such a way as to have a predefined density.

The printing extensibility application 350 performs control in such a manner that the density per predetermined area becomes similar between the latent image data generated in step S1001 and the background data generated in step S1002. This enables outputting a print product in which a region of a character string or a stamp expressed by large dots and a region expressed by small dots look as a thin uniform pattern (even pattern). If such a print product is scanned or copied to produce a copy thereof, in a region expressed by small dots, background data drawn with small dots is not read by the scanner and thus disappears in the copy, and a hidden character string drawn with large dots remains and emerges in the copy. Accordingly, the copy being a duplicated document becomes known at a glance.

Referring back to the description of FIG. 10, in step S1003, the printing extensibility application 350 determines which of watermark printing and overlay printing the value of the data item 759 is. If, in step S1003, it is determined that the value of the data item 759 is watermark printing (WATERMARK PRINTING in step S1003), the printing extensibility application 350 advances the processing to step S1004, and, if, in step S1003, it is determined that the value of the data item 759 is overlay printing (OVERLAY PRINTING in step S1003), the printing extensibility application 350 advances the processing to step S1005.

In step S1004, the printing extensibility application 350 edits the XPS in such a manner that the latent image data generated in step S1001 and the background data generated in step S1002 are output on the back side of the original drawing data. In other words, the printing extensibility application 350 combines copy-forgery-inhibited pattern data, which is configured with the latent image data and the background data, with the back side of the original drawing data.

On the other hand, in step S1005, the printing extensibility application 350 edits the XPS in such a manner that the latent image data generated in step S1001 and the background data generated in step S1002 are output on the front side of the original drawing data. In other words, the printing extensibility application 350 combines copy-forgery-inhibited pattern data, which is configured with the latent image data and the background data, with the front side of the original drawing data. After completing the processing in step S1004 or S1005, the printing extensibility application 350 advances the processing to step S908 illustrated in FIG. 9.

Next, in step S908, the printing extensibility application 350 edits the PrintTicket and the XPS based on the data item 751 for the N-up printing 721 and the data item 752 for the stapling 722, which have been set via the advanced print setting dialog 720. After completing editing in step S908, the printing extensibility application 350 writes the edited PrintTicket and XPS back to the spooler 302 of the OS 210, thus completing the process for the applications 212.

In step S910, the OS 210 acquires PrintTicket and an XPS file from the spooler 302 via the filter pipeline manager 303.

In step S911, the OS 210 reads out a filter 311 compatible with a printer driver 211 which is to be used from the external memory 209 based on the definition of the filter configuration 312 via the filter pipeline manager 303, and loads the filter 311 onto the RAM 202. In step S912, the OS 210 inputs the XPS to the loaded filter 311 via the filter pipeline manager 303, thus performing PDL conversion processing with use of the filter 311. Furthermore, the filter 311 which is used for the PDL conversion processing in step S912 can include a plurality of filters. In step S913, the OS 210 transfers the PDL which has been obtained as a result of the PDL conversion processing in step S912 to the spooler 302 via the filter pipeline manager 303. After that, the OS 210 transmits, to the target printer (for example, the printing apparatus 102), data including the PDL and PrintTicket as a print job in cooperation with the network I/F 213 via the spooler 302.

The printing apparatus, which has received the print job, prints a print image on a sheet based on the print job. In a case where copy-forgery-inhibited pattern data is included in the print job, the printing apparatus is able to output a print product containing hidden information such as a character string or pattern. At this time, with regard to latent image data and background data, data generated based on characteristic parameters of a printing apparatus selected as the target printer and in conformity with the printing capability of the printing apparatus is used. Accordingly, the printing apparatus is able to perform appropriate copy-forgery-inhibited pattern printing.

The above-described series of processing operations enables implementing a copy-forgery-inhibited pattern printing function that is based on characteristic parameters of each printing apparatus. With this, even in a case where the shared printer driver 211 is used, it is possible to implement copy-forgery-inhibited pattern generation processing that is based on copy-forgery-inhibited pattern parameters which differ according to printing apparatuses serving as output destinations.

<Modification Example Concerning Characteristic Parameters>

Figure 11A:
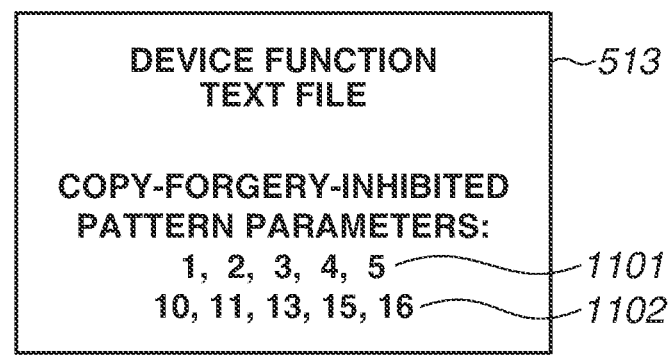
FIGS. 11A and 11B are diagrams illustrating a screen which is displayed on the display of the computer and setting values which are set via the screen.
Figure 11B:
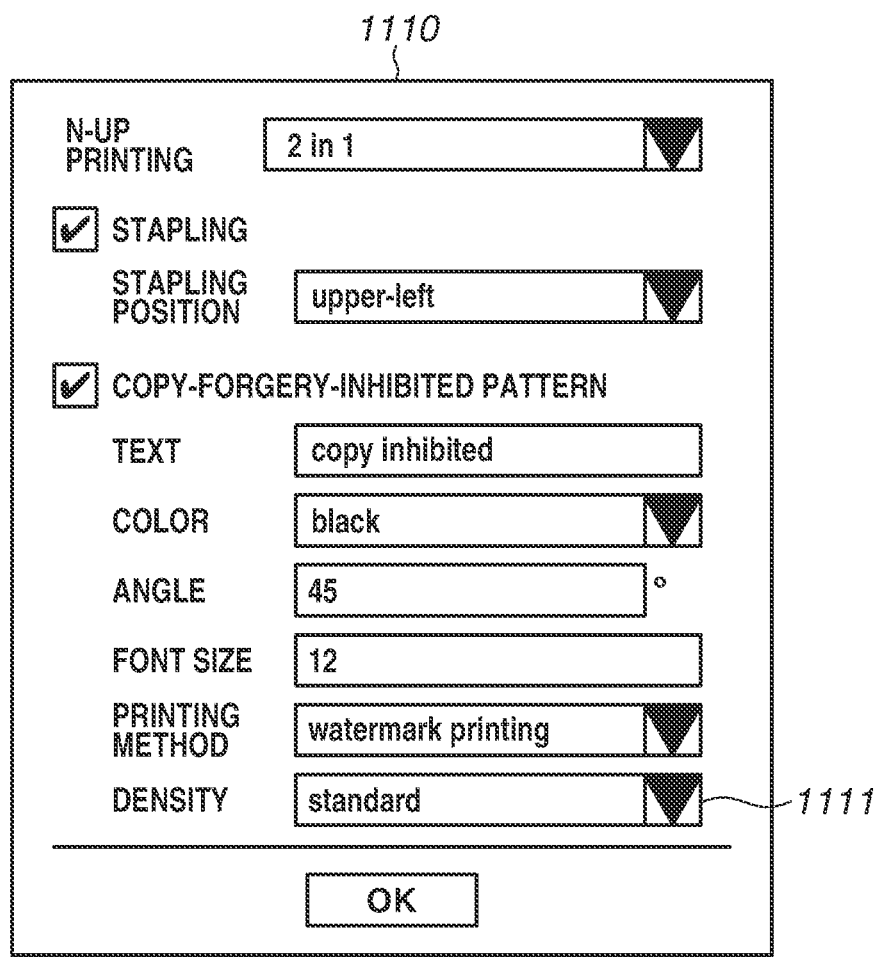

In the above-described exemplary embodiment, a case where copy-forgery-inhibited pattern parameters, which are examples of characteristic examples, are a set of small and large size parameters, i.e., the small dot size 761 and the large dot size 762, has been described as an example. However, the copy-forgery-inhibited pattern parameters can be configured in another way. FIGS. 11A and 11B are diagrams illustrating a modification example of the copy-forgery-inhibited pattern parameters. As illustrated in FIG. 11A, a configuration in which copy-forgery-inhibited pattern parameters including a small dot size row 1101 and a large dot size row 1102 are described in the device function text file 513 can be employed. The small dot size row 1101 and the large dot size row 1102 are parameters in the case of supposing specifications in which the density of a copy-forgery-inhibited pattern is able to be changed by a user operation, and represent the values of dot sizes corresponding to five-level densities.

A configuration in which the density is able to be adjusted by a user operation has the following advantages. In printing apparatuses of the electrophotographic type, individual differences between print engines or density variations caused by aging may occur even in the same model printing apparatuses. In a case where density variations have occurred, changing the density of a copy-forgery-inhibited pattern by a user operation enables performing more appropriate copy-forgery-inhibited pattern printing.

FIG. 11B illustrates an example of an advanced print setting dialog 1110 provided to set the density of a copy-forgery-inhibited pattern. Which value of each of the small dot size row 1101 and the large dot size row 1102 is to be used is able to be switched according to the value of the density setting 1111 of the advanced print setting dialog 1110. Moreover, while, in the above-described exemplary embodiment, the predefined densities for use in the copy-forgery-inhibited pattern generation processing operations in steps S1001 and S1002 are fixed values, a configuration in which predefined densities for each printing apparatus are described in the device function text file 513 as characteristic parameters dependent on each printing apparatus can be employed.

Additionally, while, in the above-described exemplary embodiment and the above-described modification example, parameters of the copy-forgery-inhibited pattern printing function are used as an example of characteristic parameters which are supplied to the printing extensibility application 350 and the copy-forgery-inhibited pattern printing function is used as an example of a unique function of the printing extensibility application 350, the above-described exemplary embodiment and the above-described modification example are not limited to this. For example, characteristic parameters about a color profile or a dither matrix for use in halftone processing can be supplied to the printing extensibility application 350. The printing extensibility application 350, which has received such characteristic parameters, is able to implement the function of color matching based on the color profile or is able to perform setting of, for example, the number of lines per inch in a case where halftone processing is performed on the printing apparatus.

<Modification Example Concerning Method for Supplying Characteristic Parameters>

In the above-described exemplary embodiment, in the processing performed in step S410, the device function text file and the script file, which the shared printer driver 211 manages, are overwritten or extended with a file including characteristic parameters included in the extension INF package. Moreover, characteristic parameters included in the overwritten or extended file are stored in the application save area 355 during print setting performed by the printing extensibility application 350, so that the characteristic parameters can be supplied to a region which the printing extensibility application 350 is able to access. However, timing at which to supply characteristic parameters is not limited to this. For example, in the extension setup processing in step S410, the OS 210 can be configured to store characteristic parameters in the application save area 355 of a printing extensibility application compatible with the target printer.

<Modification Example Concerning Timing at which to Supply Unique Function>

Moreover, while, in the above-described exemplary embodiment, a case where, before processing target data of XPS is converted into PDL, the unique function of the vendor described in steps S902 to S908 is performed has been described as an example, the above-described exemplary embodiment is not limited to this. A configuration in which, after steps S910 to S912, which are processing for conversion into PDL such as PDF or raster data, are performed, the unique function of the vendor is supplied can be employed. Thus, processing in steps S910 to S912 can be first performed, and then, processing corresponding to steps S902 to S908 can be performed.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-190015 filed Oct. 5, 2018, which is hereby incorporated by reference herein in its entirety.

What is claimed is:

1. An information processing apparatus comprising one or more processors configured to:
   acquire identification information identifying a type of an image forming apparatus from the image forming apparatus;
   store the acquired identification information and a printer driver that generates print data to be sent to the image forming apparatus; and
   acquire an application that is corresponding to the stored identification information and provides a print setting screen that enables a user to perform print setting to be used for the printer driver to generate the print data,
   wherein capability of the image forming apparatus, that is capability regarding a function for printing a predetermined image, is acquired from a server different from the image forming apparatus after the identification information and the printer driver are stored, and
   wherein the application provides, based on the acquired capability, the print setting screen that enables a user to perform print setting regarding the function.

2. The information processing apparatus according to claim 1, wherein the capability regarding the function for printing the predetermined image includes at least a parameter for use in a copy-forgery-inhibited pattern printing function, which embeds a pattern that emerges when an original is copied in a background of a print product as a hidden pattern.

3. The information processing apparatus according to claim 2, wherein the parameter for use in the copy-forgery-inhibited pattern printing function includes parameters indicating a size of dots which are used to express a hidden pattern and a size of dots which are used for a pattern different from the hidden pattern.

4. The information processing apparatus according to claim 1, wherein the print setting screen provided based on the acquired capability enables a user to set at least one of a character string to be combined with an image, a color of the character string, and a size of the character string.

5. The information processing apparatus according to claim 1, wherein the capability is information indicating a color of characters usable as a color of a character string to be combined with an image.

6. The information processing apparatus according to claim 1, wherein the application edits the print data generated by the printer driver based on settings set via the print setting screen provided by the application.

7. The information processing apparatus according to claim 6, wherein the application added, based on a setting regarding the function, the predetermined image to the print data generated by the printer driver.

8. The information processing apparatus according to claim 1, wherein the identification information is information of a model of the image forming apparatus.

9. The information processing apparatus according to claim 1, wherein the one or more processors configured to:
acquire, with use of the stored identification information, application identification information identifying the application; and
acquire the application based on the acquired application information.

10. The information processing apparatus according to claim 1, wherein the identification information is stored in association with the printer driver.

11. The information processing apparatus according to claim 1, wherein the one or more processors configured to:
acquire other capability of the image forming apparatus from the image forming apparatus,
wherein the capability is acquired after said other capability is acquired from the image forming apparatus.

12. An information processing apparatus in which an application corresponding to identification information acquired from an image forming apparatus has been installed, the information processing apparatus performing by executing the application:
displaying, based on capability of the image forming apparatus acquired from a server different from the image forming apparatus, a print setting screen that enables a user to perform print setting to be used for a printer driver to generate print data, wherein the acquired capability, that is capability regarding a function for printing a predetermined image, is acquired from the server after the identification information and the printer driver are stored; and
providing the print setting set via the displayed print setting screen to the printer driver.

13. The information processing apparatus according to claim 12, wherein the application is an application identified by application identification information acquired based on the acquired identification information of the image forming apparatus.

14. The information processing apparatus according to claim 12, wherein the acquired identification information of the image forming apparatus is information of a model of the image forming apparatus.

15. The information processing apparatus according to claim 12, wherein the capability of the image forming apparatus is capability for printing an image to which the predetermined image has been added.

16. A control method for controlling an information processing apparatus in which an application corresponding to an identification information acquired from an image forming apparatus has been installed, the control method performed by executing the application comprising:
displaying, based on capability of the image forming apparatus acquired from a server different from the image forming apparatus, a print setting screen that enables a user to perform print setting to be used for a printer driver to generate print data, wherein the acquired capability, that is capability regarding a function for printing a predetermined image, is acquired from the server after the identification information and the printer driver are stored; and
providing the print setting set via the displayed print setting screen to the printer driver.

17. The control method according to claim 16, wherein the application is an application identified by application identification information acquired based on the identification information of the image forming apparatus.

18. The control method according to claim 16, wherein the identification information of the image forming apparatus is information of a model of the image forming apparatus.

19. The control method according to claim 16, wherein the capability of the image forming apparatus is capability for printing an image to which the predetermined image has been added.

20. A non-transitory computer-readable storage medium storing an application that includes computer-executable instructions, which when executed by one or more processors of an information processing apparatus in which the application has been installed, cause the information processing apparatus to perform operations comprising:
displaying, based on capability of the image forming apparatus acquired from a server different from the image forming apparatus, a print setting screen that enables a user to perform print setting to be used for a printer driver to generate print data, wherein the acquired capability, that is capability regarding a function for printing a predetermined image, is acquired from the server after the identification information and the printer driver are stored; and
providing the print setting set via the displayed print setting screen to the printer driver.

21. The non-transitory computer-readable storage medium according to claim 20, wherein the application is an application identified by application identification information acquired based on the identification information of the image forming apparatus.

22. The non-transitory computer-readable storage medium according to claim 20, wherein the identification information of the image forming apparatus is information of a model of the image forming apparatus.

23. The non-transitory computer-readable storage medium according to claim 20, wherein the capability of the image forming apparatus is capability for printing an image to which the predetermined image has been added.

* * * * *